United States Patent

Canlas et al.

[11] Patent Number: 5,940,244
[45] Date of Patent: Aug. 17, 1999

[54] SHRINK-FIT DISK-CLAMP FOR HARD DISK DRIVES

[75] Inventors: Eduardo Gatmaitan Canlas, San Jose; Ambrish Misra, Milpitas, both of Calif.

[73] Assignee: International Business Machines Corporation, Armonk, N.Y.

[21] Appl. No.: 08/865,344

[22] Filed: May 29, 1997

[51] Int. Cl.[6] ................................................. G11B 17/08
[52] U.S. Cl. ...................................... 360/98.08; 360/99.12
[58] Field of Search ............................ 360/97.01, 98.01, 360/98.08, 99.05, 99.12

[56] References Cited

U.S. PATENT DOCUMENTS

| | | | |
|---|---|---|---|
| 5,214,326 | 5/1993 | Yonei | 310/67 R |
| 5,436,775 | 7/1995 | Ishimatsu | 360/98.08 |
| 5,452,157 | 9/1995 | Chow et al. | 360/98.08 |
| 5,497,281 | 3/1996 | Jewell et al. | 360/98.08 |
| 5,636,083 | 6/1997 | Sanada | 360/98.08 |
| 5,732,458 | 3/1998 | Moir et al. | 29/603.03 |

FOREIGN PATENT DOCUMENTS 8-297944  11/1996  Japan .

Primary Examiner—Jefferson Evans
Attorney, Agent, or Firm—Monica D. Lee

[57] ABSTRACT

A ring shaped-disk clamp for clamping a disk stack to a spindle motor. The ring-shaped disk clamp is referred to as a shrink-fit disk clamp and must be expanded by heating prior to being inserted onto the hub of a spindle motor. Once inserted onto the hub of the spindle motor, an external axial load is applied to the disk clamp. As the disk clamp cools while applying the external load, the clamp contracts and provides a gripping force on the hub of the spindle motor. Subsequently, the external load is removed. The ring-shaped disk clamp includes a top surface, a bottom surface for contacting the disk stack, and an inner peripheral surface for contacting the hub. The inner peripheral surface contacts the hub at a hub contact area that is optimized to provide a localized gripping force on the hub. By optimizing the location of the hub contact area, the disk clamp can provide a relatively high gripping force with a low coefficient of friction between the disk clamp and the hub.

24 Claims, 9 Drawing Sheets

SHRINK-FIT DISK-CLAMP FOR HARD DISK DRIVES

BACKGROUND OF THE INVENTION

1. Field of the Invention

This invention relates to a disk drive having at least one rotating memory disk. More particularly, this invention relates to a clamp used to clamp one or more rotating memory disks to a spindle motor hub to form a disk stack.

2. Description of the Related Art

Conventional disk drives typically include more than one disk stacked on a hub. Positioned between each disk is a spacer. The disks and spacers are generally referred to as a disk stack. The term disk stack also applies to a disk drives having only one disk and no spacer. The disk clamp provides a compressive load on the disk stack to hold the disks in place. The compressive load acts on the inner diameter of the disk or disks in the disk stack and is in a direction which is parallel to the axis of the hub. This compressive load may be referred to as an axial load because it acts in the axial direction.

Conventional disk clamps are available in various configurations. One known type of disk clamp uses screws passed through a circular plate and into tapped openings in the hub to provide the axial load. Unfortunately, the circular plate and screws add height to the disk stack, which is often undesirable when making smaller, shorter disk drives. In addition, the individual screws produced localized stresses in thinner disks and have the effect of causing the disks to distort at the inner diameter. The disk may actually become wavy at the inner diameter. This phenomena is often referred to a "potato chipping" because the disk's shape resembles the shape of a potato chip. Usually, each screw in the disk causes a lobe on the surface of the disk creating a non-uniform or distorted disk surface. When the disk surface is distorted in this manner, it is very difficult to maintain a uniform fly height of the transducer (i.e., read/write transducer) as the head assembly moves across the disk surface. Accordingly, when potato chipping occurs on a disk, the fly height varies and the data channel is often used to compensate for the variation in the signal from the transducer.

A second known type of disk clamp includes a bell-shaped part that operates as a spring. Typically screws are passed through openings in the center of the bell-shaped part and into a tapped opening in the hub. Unfortunately, providing a hub with enough material for a tapped opening requires height. In addition, attaching the screws at the center of the hub causes the bell-shaped part to flatten as the screws are tightened. The edges of the bell-shaped part which contact the disk during tightening move across the surface of the disk in a radially outward direction. The movement of the disk clamp with respect to the disk causes distortion, which makes the disk become conical in shape, and produces a radial load on the disk. This phenomena is often referred to as disk dropping.

A third known type of disk clamp is a heat-shrink ring which is attached to the top of the hub without the use of screws. This type of disk clamp is often referred to as a shrink-fit disk clamp. A ring is heated so that it expands and the inner diameter of the ring is greater than the outer diameter of the hub. A tool is then used to transfer the heated ring to the top of the disk stack and to apply a clamping force to the heated ring. The clamping force is maintained on the ring as it cools. Although known shrink-fit disk clamps may be designed to minimize the distortion of the disk surface and minimize the amount of height needed to accommodate the disk clamp, these shrink-fit disk clamps are more likely to slip from the hub because they are not secured by screws. Slippage generally occurs when the friction force between the disk clamp and the hub is less than the axial load applied to the disk clamp (or the residual stack load applied by the clamp). Thus, when using shrink-fit disk clamps, the coefficient of friction between the hub and the clamp must be large enough to prevent slippage. Furthermore, slippage may become more prevalent as the mass of the disk stack increases and as the spindle motor is required to withstand higher shock loads.

FIGS. 1a–b illustrate two views of a conventional N-shaped shrink-fit disk clamp 1. FIG. 1a is a top view of disk clamp 1 illustrating the ring-shape of disk clamp 1. The disk clamp 1 includes an inner diameter portion or inner leg 6, an outer diameter portion or outer leg 8, and a compliant portion or cross member 7. The cross member 7 attaches the inner leg 6 and the outer leg 8 to form the N-shape of the disk clamp 1. FIG. 1b illustrates a cross sectional view of the disk-clamp 1. The inner diameter portion includes a hub gripping portion 2. The outer diameter portion or outer leg 8 includes a disk contacting portion 4 and a free end 5. The cross member or compliant section 7 angles from the portion of the outer leg 8 near the disk contacting portion 4 to inner leg 6. The hub gripping portion 2 of the disk clamp 1 contacts a hub 3 as a result of the pre-load and the contraction of disk clamp 1 during cooling. The inner leg 6 does not contact a disk. The disk contacting portion 4 of the outer leg 8 of disk clamp 1 contacts the disk. Both the thickness of cross member 7 and an angle 9 between cross member 7 and inner leg 6 (or outer leg 8) can be varied to alter the compliance (or stiffness) of the cross member 7 such that the axial load minimizes the distortion of the disks.

As mentioned above, the coefficient of friction between hub 3 and the hub gripping portion 2 of disk clamp 1 must be high enough to prevent disk clamp 1 from slipping off of hub 3. A conventional disk clamp 1 made of an aluminum alloy and providing a clamping force of 250 lbs may require a coefficient of friction greater than 0.4 to prevent slippage from hub 3, which is also made from an aluminum alloy. In order to provide a sufficiently large coefficient of friction between the disk clamp 1 and hub 3, disk clamp 1 was deliberately oxidized (e.g. 5000–10,000 Å) to form a surface coating of aluminum oxide on disk clamp 1. Although the coefficient of friction between disk clamp 1 and hub 3 is increased and the likelihood of slippage is minimized when disk clamp 1 is oxidized, the oxidation of disk clamp 1 may contaminate the disk surface and adversely affect the performance of the disk drive. More specifically, oxidized particles from disk clamp 1 fall onto the disk surface. This can result in loss of data stored in the disk drive.

SUMMARY OF THE INVENTION

It is desirable to provide a disk clamp that provides a localized gripping force on a hub of a spindle motor.

It is also desirable to provide a disk clamp that provides an increased gripping force at a lower coefficient of friction between the disk clamp and the hub.

Another desire is to provide a disk clamp that may not require deliberate oxidation to increase the coefficient of friction between the disk clamp and the hub.

A ring-shaped disk clamp for securing at least one disk to the hub of a spindle motor is described. The disk clamp includes a neutral bending axis, an inner circumference region, and an outer circumference region. The inner circumference region includes a top surface and an inner peripheral surface. Located on the inner peripheral surface between the top surface and the neutral bending axis is a hub contact area. The hub contact area is positioned to provide a localized gripping force on the hub. The outer circumference region includes a disk contact area.

Also described is a method of making the ring-shaped disk clamp. A ring having a top surface, a bottom surface, and an inner peripheral surface is provided. The neutral bending axis of the ring is determined. A hub contact area is formed on the inner peripheral surface between the neutral bending axis and the top surface of the ring to provide a localized gripping force on the hub. A disk contact area is formed on the bottom surface of the ring.

Other desires, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 2:
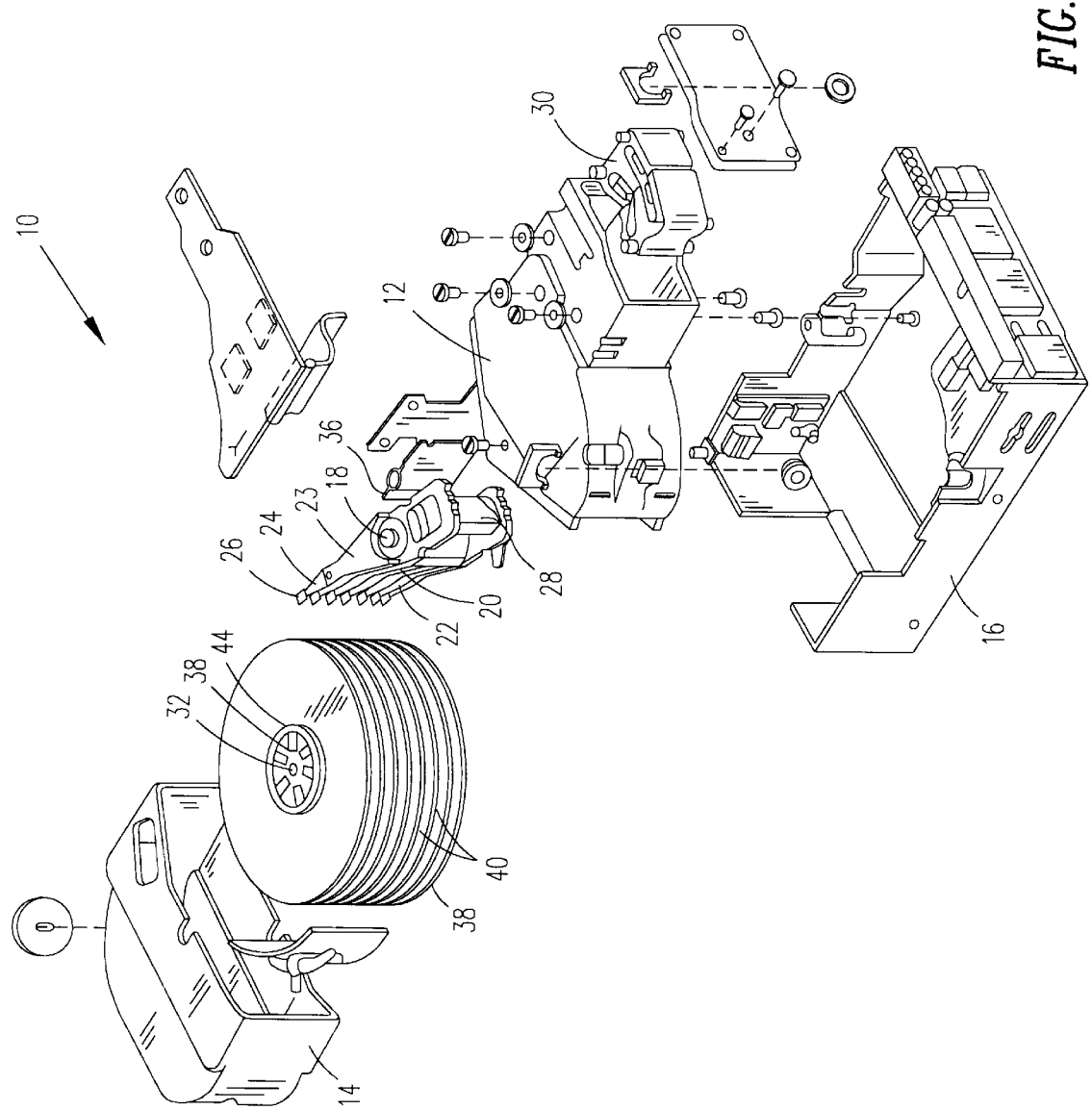
FIG. 2 illustrates an exploded view of a disk drive that incorporates one embodiment of the disk clamp.

Various embodiments of the present invention may be used with different mechanical configurations of disk drives or direct access storage devices ("DASD"). FIG. 2 is an exploded view of a disk drive 10. It should be noted that although a rotary actuator is shown, the invention described herein is applicable to disk drives with linear actuators. The disk drive 10 includes a housing 12, and a housing cover 14 which, after assembly, is mounted within a frame 16. Rotatably attached to housing 12 on an actuator shaft 18 is an actuator arm assembly 20. One end of actuator arm assembly 20 includes an E block or comb like structure 22 having a plurality of arms 23. Attached to the separate arms 23 on the comb or E block 22 are load springs 24. Attached at the end of each load spring 24 is a slider 26 which carries a magnetic transducer (not shown). On the other end of actuator arm assembly 20, opposite load springs 24 and sliders 26, is a voice coil 28.

Attached within housing 12 is a pair of magnets 30. The pair of magnets 30 and voice coil 28 are part of the voice coil motor that applies a force to actuator assembly 20 to rotate it about actuator shaft 20. Also mounted within housing 12 is a spindle shaft 32. Rotatably attached to spindle shaft 32 is a hub 33. Attached to hub 33 are a number of disks 40. In FIG. 2, eight disks are attached to hub 33 in a spaced apart relation. It should be noted that the clamp described in this application is applicable to a disk stack 38 having any number of disks 40. Also shown in FIG. 2 is a flexible cable 36 which carries electrical signals to and from actuator arm assembly 20.

Figure 3:
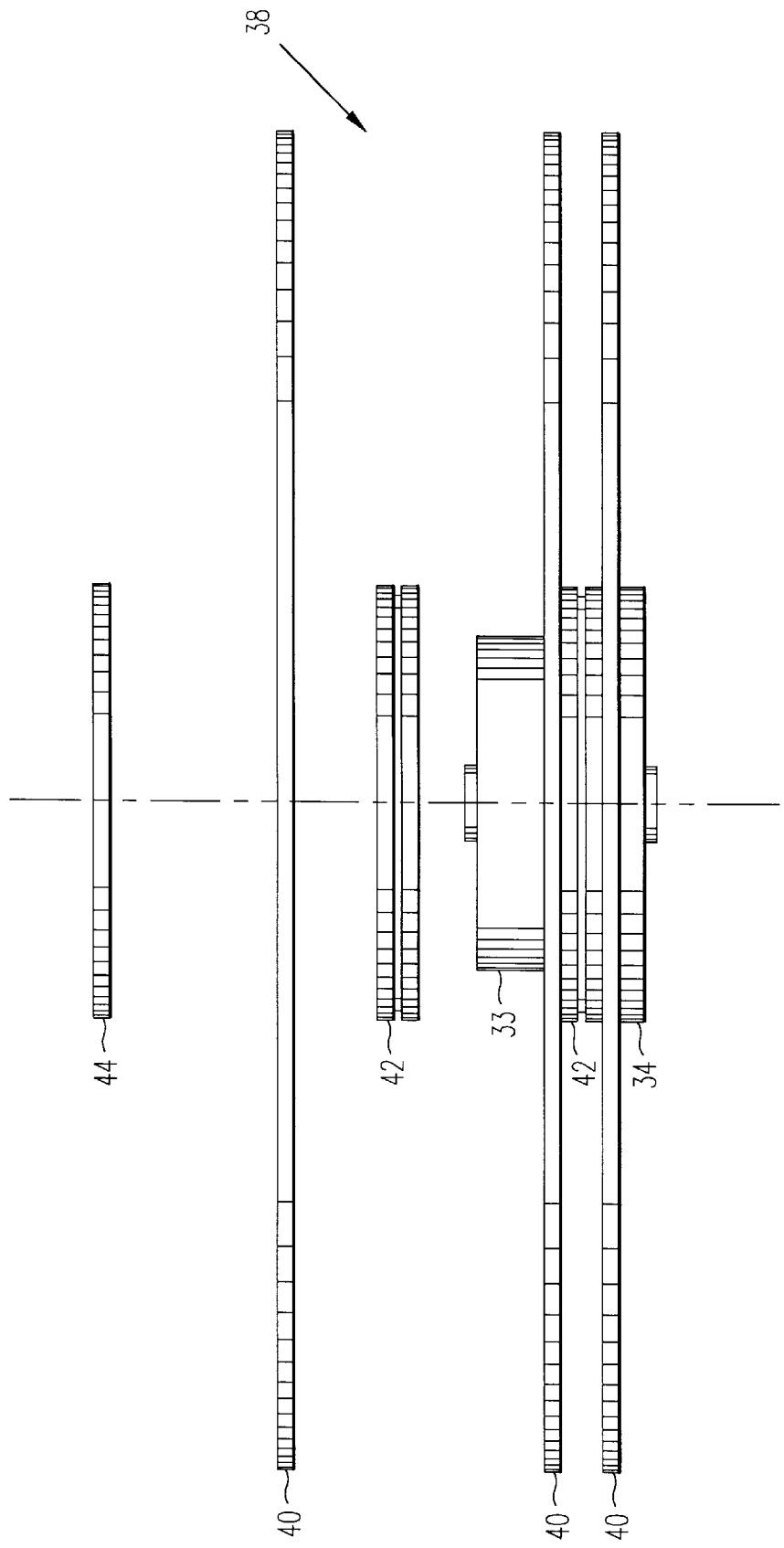
FIG. 3 illustrates an exploded view of a disk stack that incorporates one embodiment of the disk clamp.

FIG. 3 illustrates an exploded view of a disk stack 38. The hub 33 includes a flange 34 of hub 33 on which a first disk 40 is placed. Next, a spacer ring 42 is placed onto the first disk 40. The disk stack 38 is constructed by alternating disks 40 and spacer rings 42 until the desired number of disks form disk stack 38. The spacer rings 42 maintain a space between the disks 40 in the disk stack 38. FIG. 3 illustrates a disk stack having three disks 40. On the last disk 40 of disk stack 38, a disk clamp 44 is used to clamp the disks 40 and spacer rings 42 between flange 34 of hub 33 and ring clamp 44. It should be noted that a disk stack 38 having only one disk 40 would have no spacer ring 42 and that hub 33 in a one disk stack would be shorter.

Figure 4A:
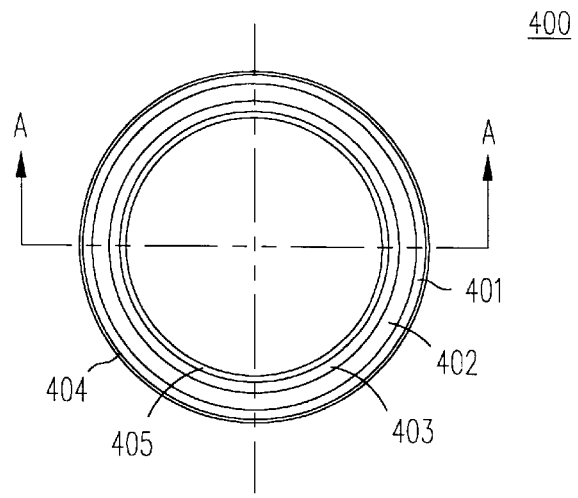
FIG. 4a illustrates a top view of one embodiment of the disk clamp.
Figure 4B:
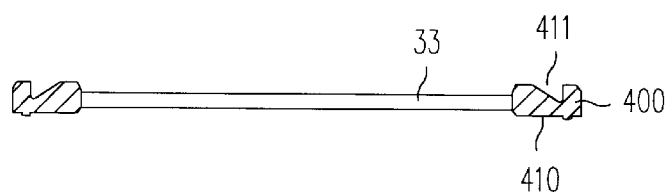
FIG. 4b illustrates a cross-sectional side view of one embodiment of the disk clamp.
Figure 4C:
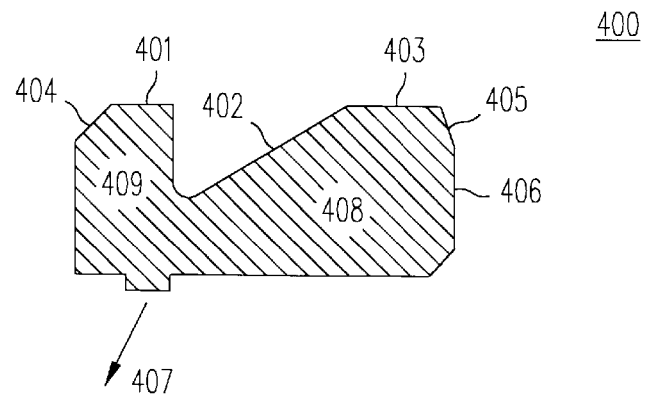
FIG. 4c illustrates an enlarged cross-sectional view of one embodiment of the disk clamp.

FIGS. 4a–4c illustrate one embodiment of a disk clamp 400. A top view of disk clamp 400 is shown in FIG. 4a, a cross-sectional side view of disk clamp 400 is shown in FIG. 4b, and an enlarged cross-sectional view of disk clamp 400 is shown in FIG. 4c. Disk clamp 400 is substantially ring-shaped and includes an inner circumferential region 408 and an outer circumferential region 409. The inner circumferential region 408 includes a hub contact area 406 for gripping the outer peripheral surface of hub 33 and the outer circumferential region 409 includes a disk contact area 407.

The location of hub contact area 406 affects the slippage of disk clamp 400 from hub and is typically positioned between the top surface 411 of disk clamp 400 and a neutral bending axis of disk clamp 400. Furthermore, hub contact area 406 is small enough to provide a localized gripping force on hub 33. By localizing the gripping force provided by disk clamp 400 at the optimal location, disk clamp 400 may increase its overall clamping force. Consequently, disk clamp 400 is less likely to slip even at a lower coefficient of friction than the prior art disk clamp 1. The neutral bending axis refers to the axis of disk clamp 400 where there is a minimum amount of radial motion when an external axial load is applied to disk clamp 400 at a top surface 403. The neutral bending axis is dependent on the geometry of disk clamp 400.

The optimal location of disk contact area 406 (i.e., the location that gives the highest residual stack load without slipping) is typically located slightly above the neutral bending axis of disk clamp 400. Factors that affect the optimal location of disk contact area 406 may include the coefficient of friction between disk clamp 400 at hub contact area 406 and the rotational stiffness of disk clamp 400, which is also dependent on the geometry of disk clamp 400.

Typically, as the coefficient of friction between disk clamp 400 and hub is increased, the optimal location of hub contact area 406 moves up from the neutral bending axis. Generally, as hub contact area 406 is positioned closer to top surface 411, disk clamp 400 is more likely to slip even at higher coefficients of friction, as compared to being positioned at or near the neutral bending axis with lower coefficients of friction. A more detailed discussion of how ring clamp 400 operates will be discussed below.

For one embodiment, hub contact area 406 was optimized for the coefficient of friction of an aluminum alloy hub 33 made from Al-2024 and an aluminum alloy disk clamp 400 made from Al-7075. For alternative embodiments, the coefficient of friction of aluminum hub 33 and disk clamp 400 may be increased by oxidizing disk clamp 400 and consequently moving the optimal location for hub contact area 406 closer to top surface 411. Generally, the closer hub contact area 406 is to top surface 411, the greater the radial clamping force from the rotation of disk clamp 400 due to hub contact area 406 moving radially inwards. This radial force is added to the force from the thermal shrink fit to increase the overall gripping force of disk clamp 400. For other embodiments, hub 33 and disk clamp 400 may be made from material other than some type of aluminum alloy, for example, steel may be substituted for the aluminum alloy.

Figure 1A:
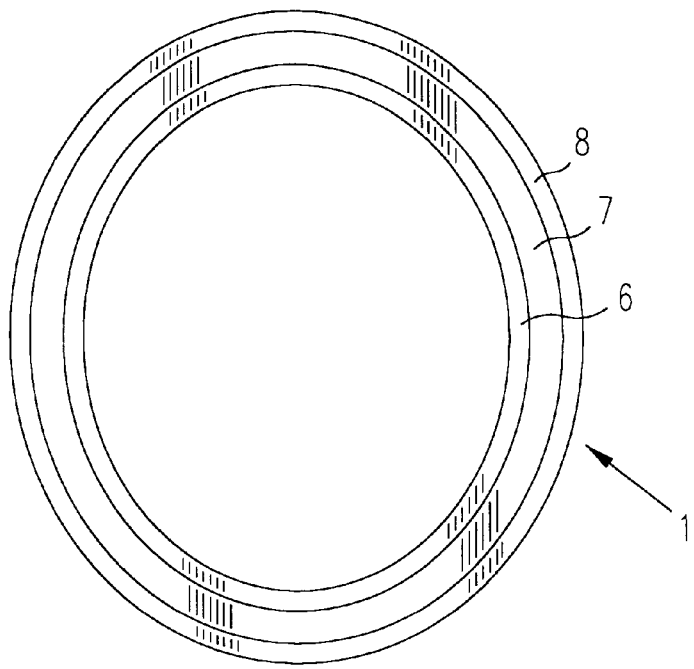
FIG. 1a illustrates a top view of a conventional disk clamp.
Figure 1B:
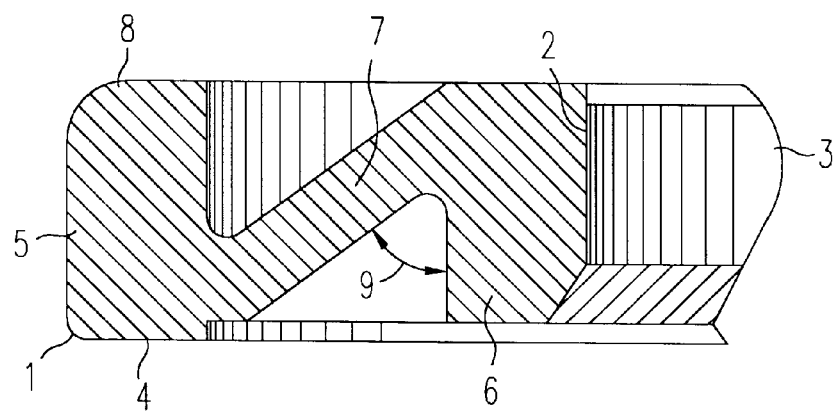
FIG. 1b illustrates an enlarged cross-sectional view of a conventional disk clamp.

The outer circumferential region 409 includes disk contact area 407. For the embodiment shown in FIG. 4c, disk contact area 407 is located on a bottom surface 410 of disk clamp 400 and forms a stepped region on an otherwise substantially flat or planar bottom surface 410. The size of the stepped region may vary. Unlike the prior art N-shaped disk clamp 1 shown in FIG. 1, disk clamp 400 does not include a circular groove on bottom surface 410. For the embodiment shown in FIG. 4c, the circular groove is filled to increase the stiffness of disk clamp 400.

For one embodiment, top surface 411 of disk clamp 400 includes a circular tapered surface 405, a circular top surface 403, a circular groove 402, a circular top surface 401, and a circular tapered surface 404. The tapered surface 405, top surface 403, and the circular groove 402 are formed on the inner circumferential region 408, whereas top surface 401 and tapered surface 404 are formed on the outer circumferential region 409.

Figure 5A:
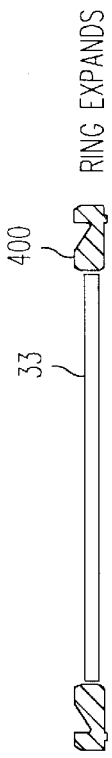
FIG. 5a illustrates a cross-sectional side view of one embodiment of an expanded disk clamp inserted onto the hub of a disk stack.
Figure 5B:
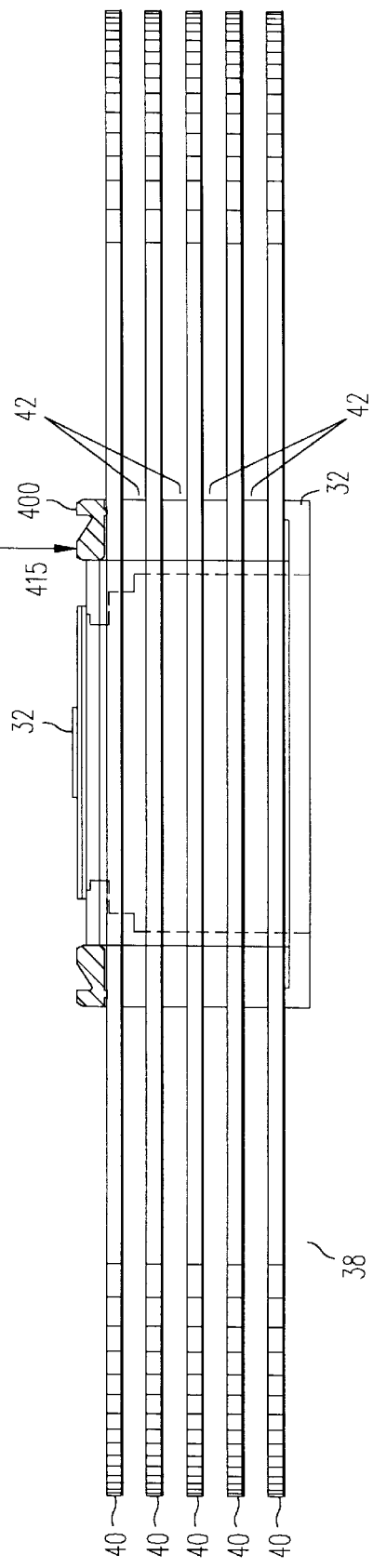
FIG. 5b illustrates a cross-sectional side view of one embodiment of a disk clamp after being completely assembled onto a disk stack.

FIGS. 5a–b illustrate how disk clamp 400 operates in greater detail. Disk clamp 400 is generally referred to as a shrink fit disk clamp. After disk stack 38 is formed by stacking disks 40 and spacer rings 42 on hub 33, disk clamp 400 is applied to complete disk stack 38. Prior to inserting disk clamp 400 onto disk stack 38, disk clamp 400 is heated to expand disk clamp 400 so that the inner diameter of disk clamp 400 is larger than the outer diameter of hub 33, as shown in FIG. 5a. The heated disk clamp 400 is then placed on the top surface of the top disk 40 in disk stack 38, as shown in FIG. 5b. A clamping load, also referred to as the external axial load, is applied to disk clamp 400 by a loading mechanism (not shown) at the point 415. The disk clamp 400 has much less mass than disk stack 38, which includes hub 33 and disks 40. As a result, disk clamp 400 cools quickly by dissipating the heat of disk clamp 400 via hub 33 and disks 40. The cooling of disk clamp 400 and the external axial load applied at 415 causes disk clamp 400 to shrink fit (i.e., contract) onto hub 33. More specifically, a gripping force (i.e., the force applied to hub 33 after axial load is removed and disk clamp 400 shrinks) at hub contact area 406 is applied to hub 33 at hub contact area 406.

Figure 6A:
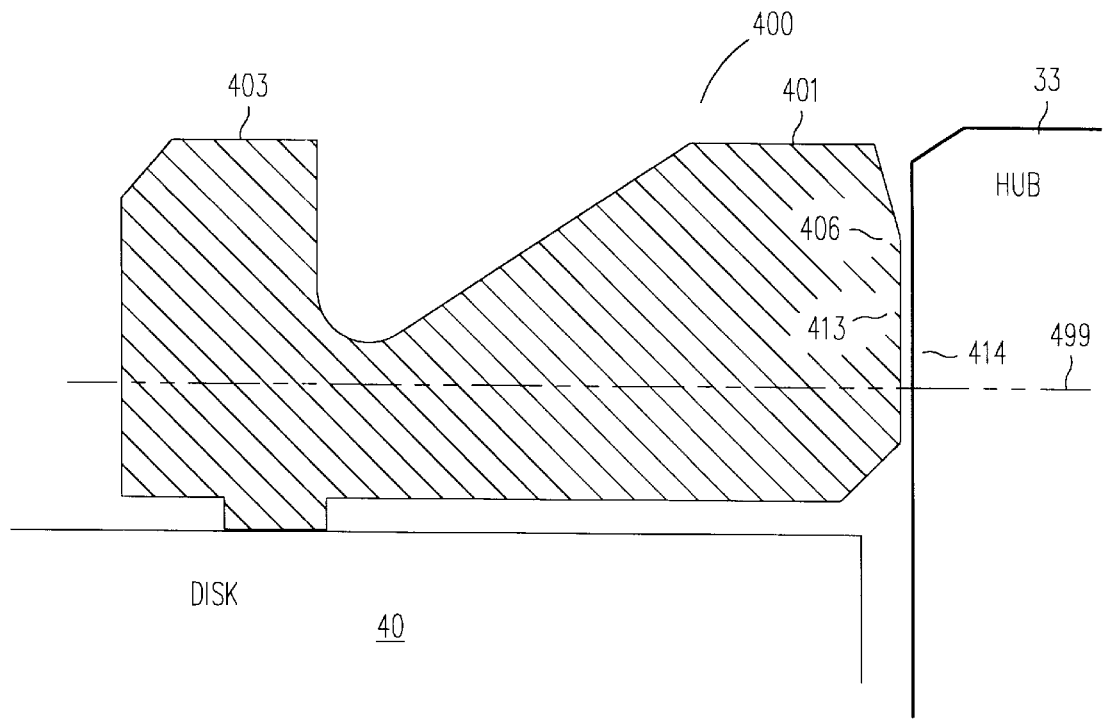
FIG. 6a illustrates an enlarged cross-sectional view of one embodiment of an expanded disk clamp inserted onto a disk stack.
Figure 6B:
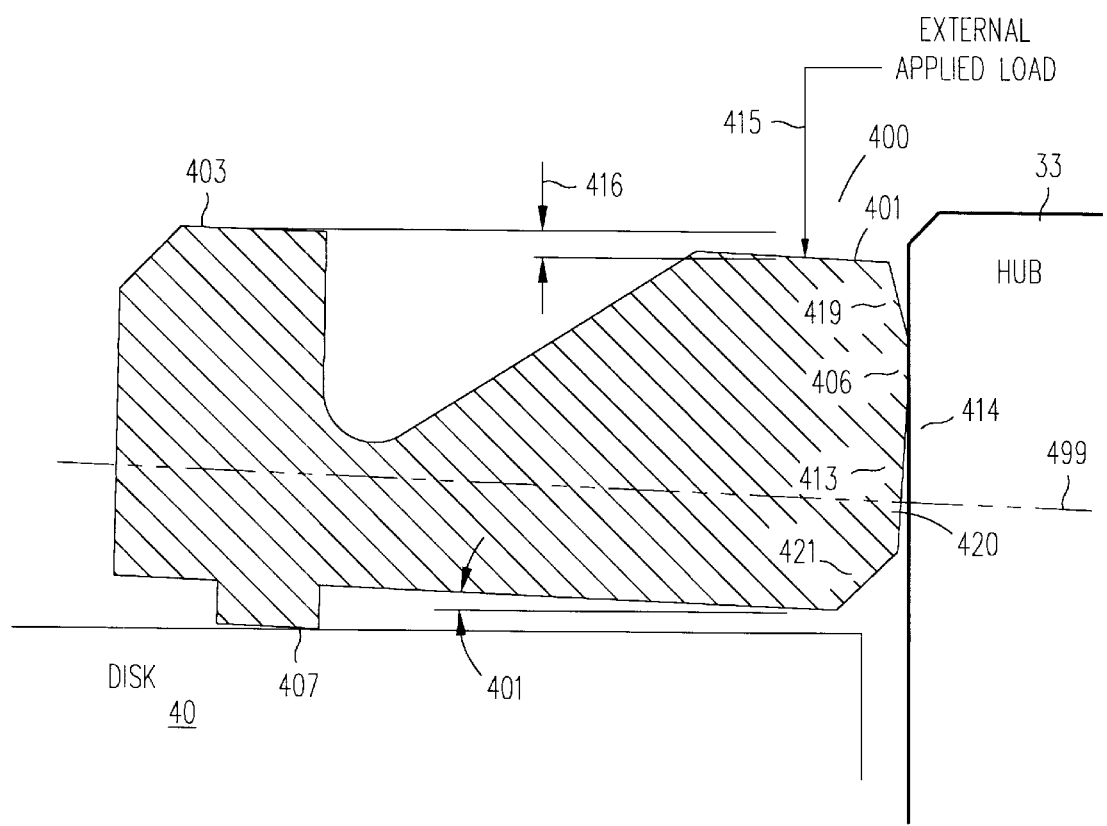
FIG. 6b illustrates an enlarged cross-sectional view of one embodiment of a disk clamp after being completed assembled onto a disk stack.

FIG. 6a illustrates an enlarged view of disk clamp 400 prior to shrink fitting onto hub 33 and FIG. 6b illustrates an enlarged view of disk clamp 400 after shrink fitting onto hub 33. When the heated disk clamp 400 is applied to disk stack 38, which includes disk 40 and hub 33, the diameter of the inner peripheral surface 413 of disk clamp 400 is larger than the outer diameter 414 of hub 33. Because of the space between disk clamp 400 and hub 33 when disk clamp 400 is heated, disk clamp 400 is easily inserted onto the upper surface of disk 40 without any interference from hub 33. Note that top surfaces 401 and 403 are substantially coplanar or parallel with top surface of disk 40.

When disk clamp 400 cools and the external axial load is applied to disk clamp 400, disk clamp 400 rotates as shown in FIG. 6b by rotational angle 417. As disk clamp 400 contracts from the cooling, hub contact area 406 becomes in contact with hub 33. The external load applied at 415, together with the shrinkage, causes disk clamp 400 to rotate radially inward (as shown by the angle of rotation 417) and causes top surfaces 401 and 403 to deflect (as shown by the distance 416) and disk clamp 400 applies a gripping force to hub 33 at disk contact area 406. Once disk clamp 400 is inserted, the externally applied load at 415 is removed. Generally, disk clamp 400 will properly grip hub 33 and clamp all disks 40 together to form disk stack 38 if the friction force between hub 33 and disk clamp 400 is greater than the force provided by the residual stack load, otherwise, disk clamp 400 is likely to slip from hub 33. The force provided by the residual stack load refers to the residual force remaining in disk stack 38 after the externally applied load is removed. The friction force is typically dependent on the coefficient of friction between hub 33 and disk clamp 400 in addition to any radially applied force at hub contact area 406. By localizing hub contact area 406 near the optimal location, disk clamp 400 may provide a stronger gripping force, which creates a stronger clamping force on disk stack 38 while requiring a lower coefficient of friction between hub 33 and disk clamp 400 and reducing the likelihood of disk clamp 400 slipping off of hub 33. Furthermore, if disk clamp 400 is not oxidized to increase the coefficient of friction between hub 33 and disk clamp 400 the drawbacks associated with oxidizing aluminum do not affect the performance of the disk drive, namely, disks 40 will not be contaminated by oxidized particles falling from disk clamp 400.

As stated above, hub contact area 406 is optimized to provide the highest residual stack load while preventing slippage. Typically, a higher residual stack load is desired when the mass of disk stack 38 is increased (e.g., when disk stack 38 includes a larger number of disks). The hub contact area 406 is generally a small area that allows the gripping force applied to hub 33 to be localized around the optimal location. As stated above, the optimal location of hub contact area 406 is typically located slightly above the neutral bending axis of disk clamp 400 and is dependent on both the coefficient of friction and the rotational stiffness of disk clamp 400. By providing a smaller hub contact area 406, the gripping force applied by disk clamp 400 to hub 33 can be designed to be localized near the optimal location (i.e., in close proximity to the neutral bending axis taking into consideration the coefficient of friction between hub 33 and disk clamp 400 and the rotational stiffness of disk clamp 400). For one embodiment, the neutral bending axis and the optimal location of hub contact area 406 is simulated by software using finite element modeling.

For one embodiment, disk clamp 400 has an inner diameter of approximately 24.2 mm, an outer diameter of approximately 32 mm, and a height of approximately 1.91 mm. Furthermore, the groove formed between top surfaces 401 and 403 has an angle of approximately 57° and is approximately 1.15 mm deep. For this embodiment, hub contact area 406 is located approximately 0.45 mm below top surface 401 and provides a gripping force of approximately 1300 lbs. The neutral bending axis may be approximately 1.0 mm below top surface 401. For a hub 33 made of Al-2024 and a disk clamp 400 made of Al-7075, the coefficient of friction is approximately 0.25.

The inner peripheral surface 413 of disk clamp 400 on which hub contact area 406 is formed may have many different configurations that produce a small hub contact area 406. FIG. 6b illustrates hub contact area 406 formed on the inner peripheral surface 413 of disk clamp 400 between a tapered area 419 and a relatively flat area 420. A tapered area 421 is formed below flat area 420.

Figure 7:
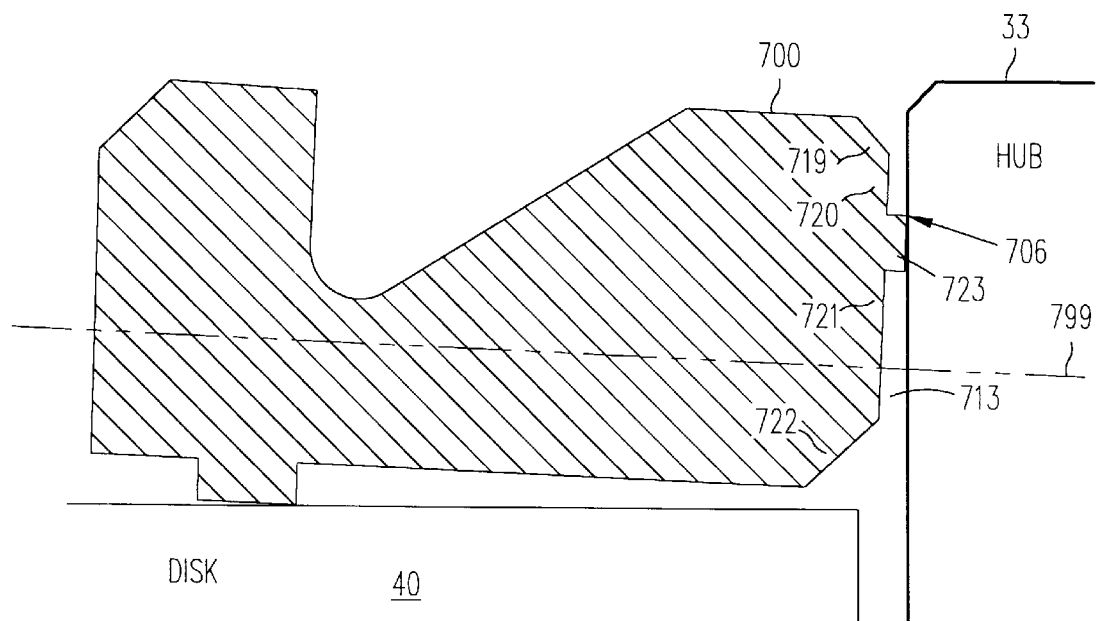
FIGS. 7–11 illustrate enlarged cross-sectional views of various embodiments of a disk clamp after being assembled onto a disk stack.

FIG. 7 illustrates a stepped area 723 formed on an inner peripheral surface 713 of a disk clamp 700. Stepped area 723 is positioned between a step area 720 and a step area 721. The hub contact area 706 is located on the upper corner of stepped area 723. A tapered area 719 is located above stepped area 720 and a tapered area 722 is located below stepped area 720.

Figure 8:
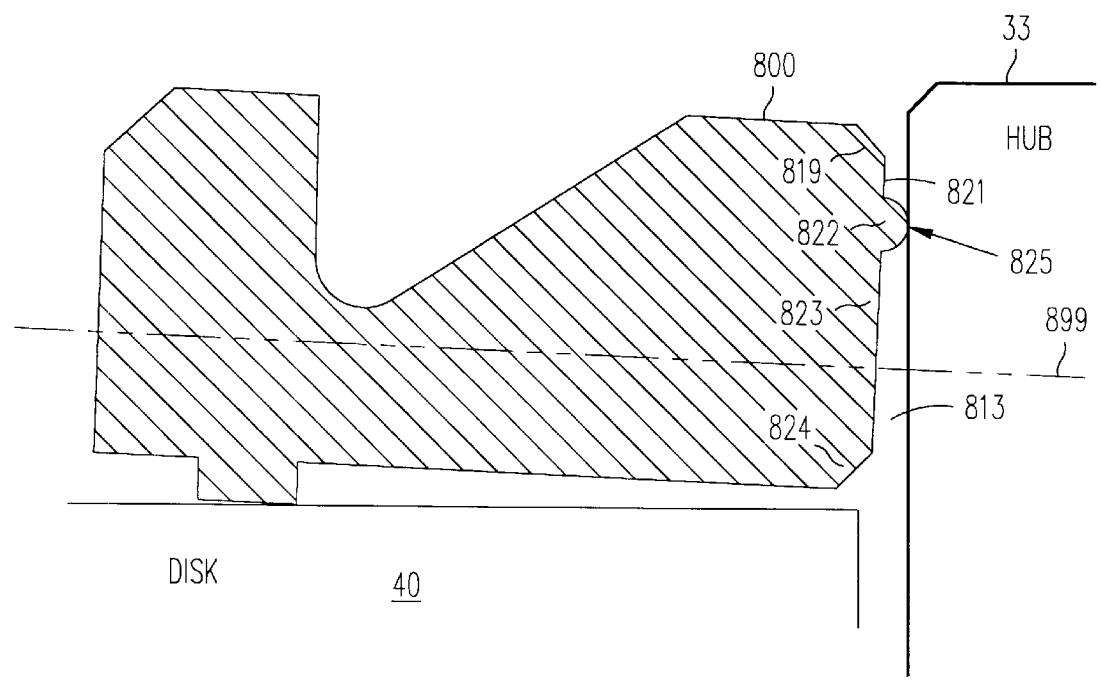
Figure 9:
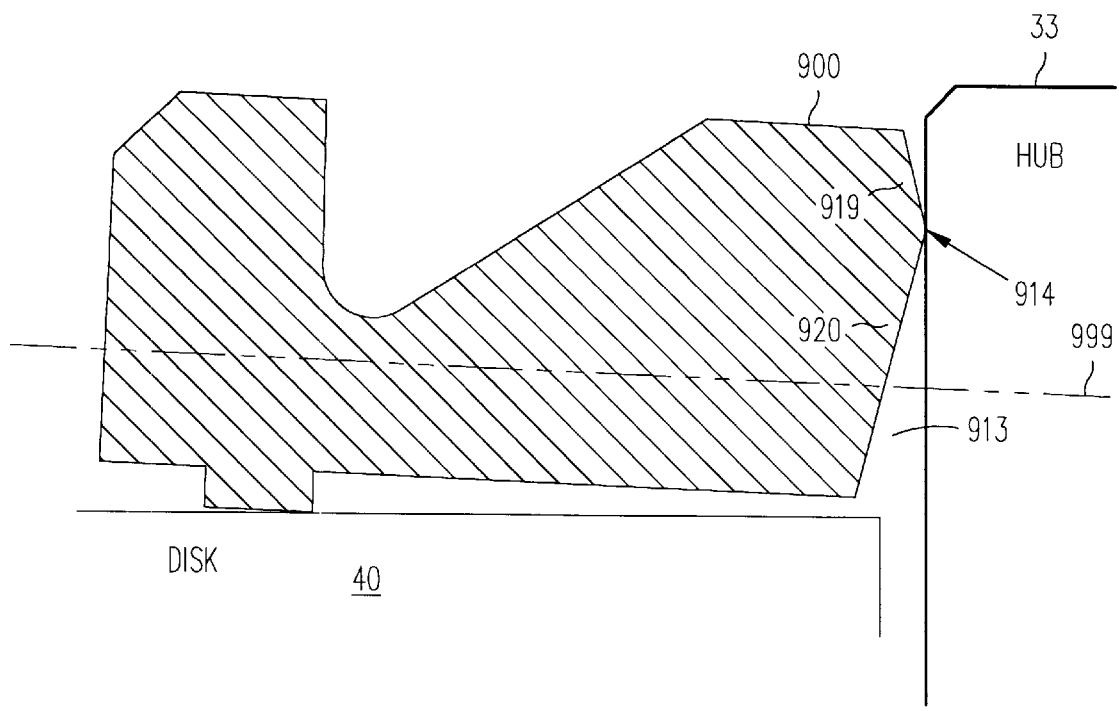

FIG. 8 illustrates a hub contact area 825 formed by a semicircular-shaped area 822 formed on an inner peripheral surface 813 of a disk clamp 800. The semicircular-shaped area 822 is positioned between relatively flat areas 821 and 823. Located above flat area 821 is a tapered area 819 and located below flat area 823 is a tapered area 824. FIG. 9 illustrates a hub contact area 914 formed on an inner peripheral surface 913 of a disk clamp 900. The hub contact area 914 is formed by an upper tapered region 919 and a lower tapered region 920.

Figure 10:
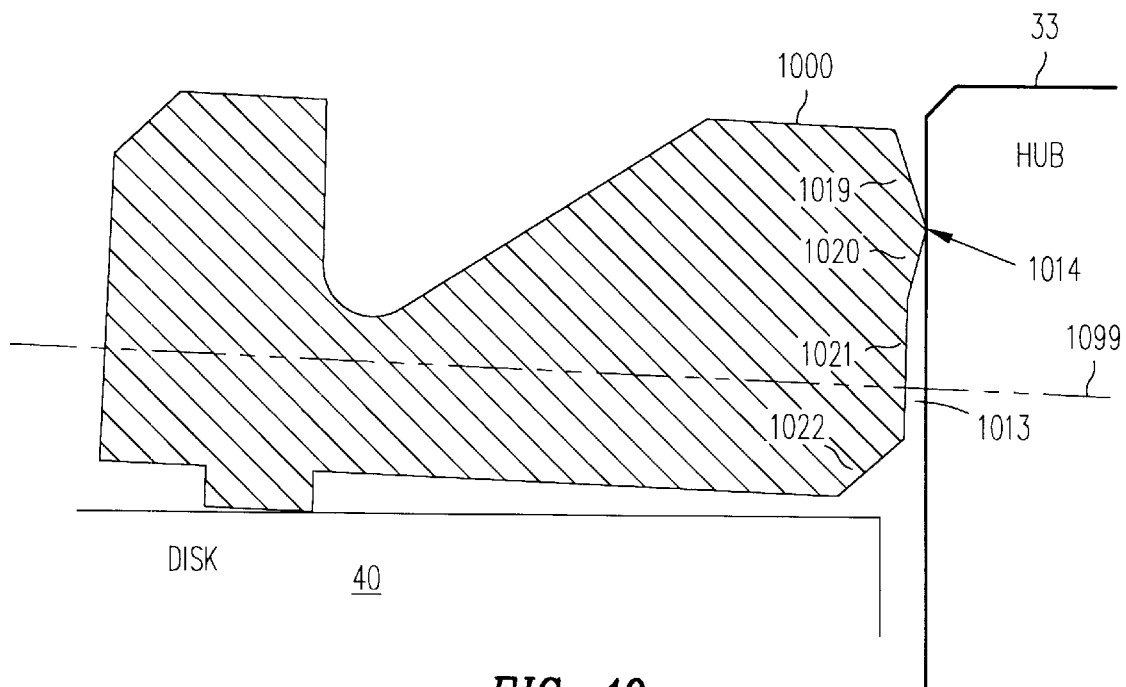

FIG. 10 illustrates a hub contact area 1014 formed between tapered regions 1019 and 1020 on an inner peripheral surface 1013 of a disk clamp 1000. Below tapered area 1020 is a relatively flat area 1021 and another tapered area 1022.

Figure 11:
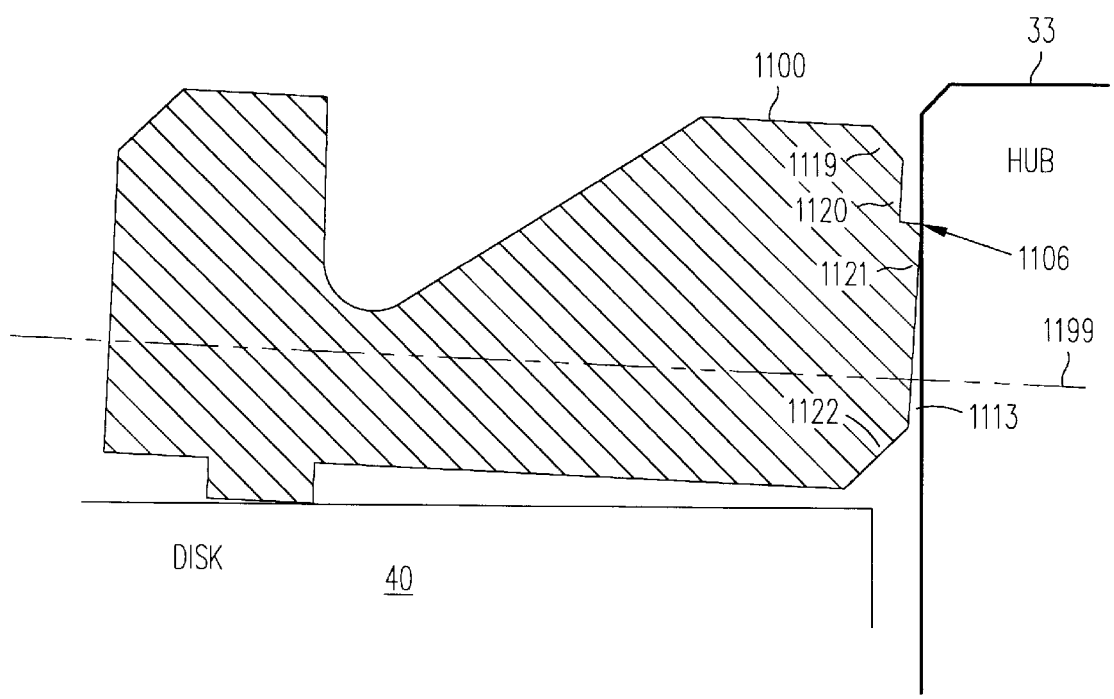

FIG. 11 illustrates a hub contact area 1106 formed on the inner peripheral surface 1113 between relatively flat areas 1120 and 1121. Located above flat area 1120 is a tapered region 1119 and located below flat region 1121 is a tapered region 1122.

The embodiments shown in FIGS. 6–11 illustrate that the hub contact areas provide relatively small contact areas between the disk clamps and the hubs. It should be noted that the hub contact areas shown in FIGS. 6–11 are typically formed between the neutral bending axis of the disk clamp and the top surface of the disk clamp. Typically, the optimal location of the hub contact area is slightly above the neutral bending axis of the disk clamp. By forming a relatively small hub contact area on the inner peripheral surface of the disk clamp, the gripping force applied to the hub is localized. As a result, the disk clamp of the present invention may provide a stronger clamping force on a disk stack. A stronger clamping force is desirable in certain situations to prevent the disks in the disk stack from moving away from the center axis of the disk stack (i.e., moving radially inward or outward from the center axis of the disk stack), when subjected to shock loading (e.g., dropped).

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A ring-shaped disk clamp for securing at least one disk to a hub of a spindle motor, comprising:
    a neutral bending axis;
    an inner circumference region having a top surface and an inner peripheral surface with an annular hub contact area located between the neutral bending axis and the top surface, the annular hub contact area positioned to provide a localized gripping force on the hub; and
    an outer circumference region having a disk contact area.

2. The ring-shaped disk clamp of claim 1, wherein the location of the annular hub contact area is optimized to reduce slippage of the ring-shaped disk clamp from the hub based on the coefficient of friction between the hub and the ring-shaped disk clamp and the rotational stiffness of the ring-shaped disk clamp.

3. The ring-shaped disk clamp of claim 1, wherein the neutral bending axis is determined by computer simulated finite element modeling.

4. The ring-shaped disk clamp of claim 1, wherein the inner peripheral surface includes at least one tapered surface and at least one flat surface that form the annular hub contact area.

5. The ring-shaped disk clamp of claim 1, wherein the inner peripheral surface includes at least two tapered surfaces that form the annular hub contact area.

6. The ring-shaped disk clamp of claim 1, wherein the inner peripheral surface includes at least one stepped surface and at least one flat surface that form the annular hub contact area.

7. The ring-shaped disk clamp of claim 1, wherein the inner peripheral surface includes at least two stepped surfaces that form a stepped area, the annular hub contact area is formed by the upper portion of the stepped area.

8. The ring-shaped disk clamp of claim 1, wherein the inner peripheral surface includes a semicircular-shaped surface that forms the annular hub contact area.

9. The ring-shaped disk clamp of claim 1, wherein the outer circumference region further includes a top surface, the top surface of the outer circumference region is separated from the top surface of the inner circumference region by a groove.

10. The ring-shaped disk clamp of claim 1, wherein the disk contact area is formed by a stepped area.

11. A disk drive system, comprising:
    a spindle motor including a hub mounted to a spindle shaft, the hub including an outer cylindrical surface;
    at least one disk having an inner diameter attached to the outer cylindrical surface of the hub;
    a ring-shaped disk clamp comprising:
        a neutral bending axis,
        an inner circumference region having a top surface and an inner peripheral surface with an annular hub contact area located between the neutral bending axis and the top surface, the annular hub contact area positioned to provide a localized gripping force on the hub, and
        an outer circumference region having a disk contact area.

12. The disk drive system of claim 11, wherein the location of the annular hub contact area is optimized to reduce slippage of the ring-shaped disk clamp from the hub based on the coefficient of friction between the hub and the ring-shaped disk clamp and the rotational stiffness of the ring-shaped disk clamp.

13. The disk drive system of claim 11, wherein the neutral bending axis is determined by computer simulated finite element modeling.

14. The disk drive system of claim 11, wherein the inner peripheral surface includes at least one tapered surface and at least one flat surface that form the annular hub contact area.

15. The disk drive system of claim 11, wherein the inner peripheral surface includes at least two tapered surfaces that form the annular hub contact area.

16. The disk drive system of claim 11, wherein the inner peripheral surface includes at least one stepped surface and at least one flat surface that form the annular hub contact area.

17. The disk drive system of claim 11, wherein the inner peripheral surface includes at least two stepped surfaces that form a stepped area, the annular hub contact area is formed by the upper portion of the stepped area.

18. The disk drive system of claim 11, wherein the inner peripheral surface includes a semicircular-shaped surface that forms the annular hub contact area.

19. The disk drive system of claim 11, wherein the outer circumference region further includes a top surface, the top surface of the outer circumference region is separated from the top surface of the inner circumference region by a groove.

20. The disk drive system of claim 11, wherein the disk contact area is formed by a stepped area.

21. A method of making a ring-shaped disk clamp for clamping a disk stack to a hub of a spindle motor, comprising the steps of:
   (a) providing a ring having a top surface, a bottom surface, and an inner peripheral surface;
   (b) determining the neutral bending axis of the ring;
   (c) forming a hub contact area on the inner peripheral surface between the neutral bending axis and the top surface to provide a localized gripping force on the hub; and
   (d) forming a disk contact area on the bottom surface.

22. The method of claim 21, further comprising the step of forming a groove on the top surface.

23. The method of claim 21, wherein step (c) includes the step of optimizing the location of the hub contact area to reduce slippage of the ring-shaped disk clamp from the hub based on the coefficient of friction between the hub and the ring-shaped disk clamp and the rotational stiffness of the ring-shaped disk clamp.

24. The method of claim 21, wherein step (b) includes the step of performing finite element modeling.

* * * * *